E. B. HUBARD & W. G. ADAMS.
MINE CAR DUMPING APPARATUS.
APPLICATION FILED JULY 1, 1908.
909,303.
Patented Jan. 12, 1909.
2 SHEETS—SHEET 1.
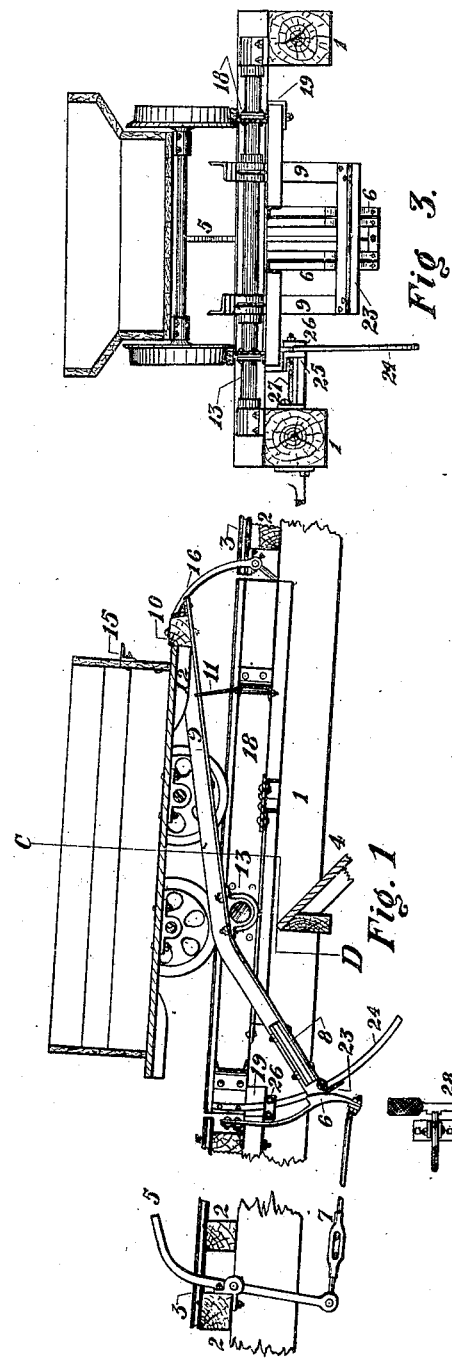
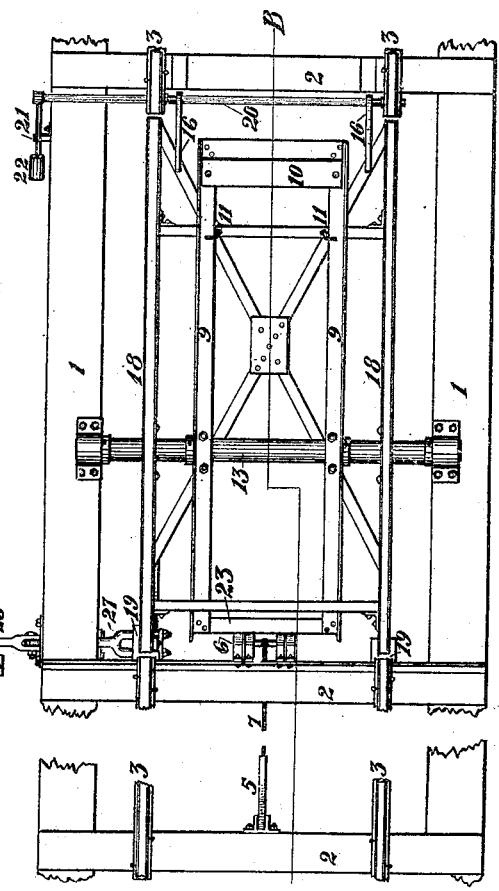

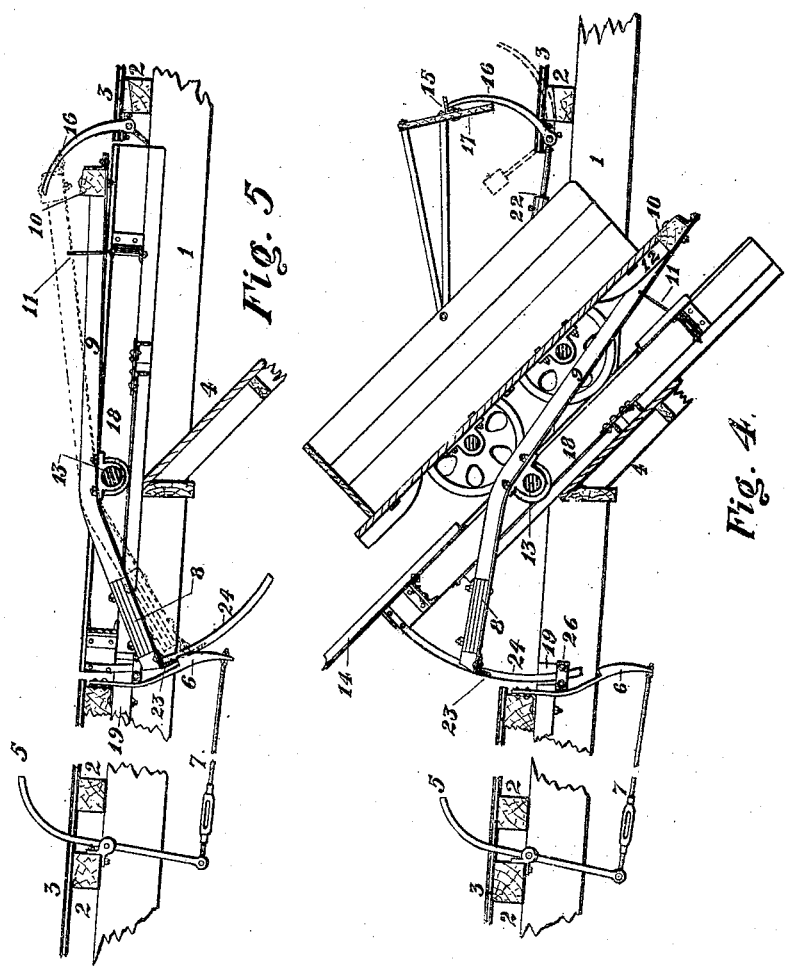

UNITED STATES PATENT OFFICE.

EDMUND BOLLING HUBARD AND WILLIAM GATEWOOD ADAMS, OF ROANOKE, VIRGINIA.

MINE-CAR-DUMPING APPARATUS.

No. 909,303.  Specification of Letters Patent.  Patented Jan. 12, 1909.

Application filed July 1, 1908. Serial No. 441,507.

*To all whom it may concern:*

Be it known that we, EDMUND B. HUBARD and WILLIAM G. ADAMS, citizens of the United States, residing at Roanoke, Virginia, have invented certain new and useful Improvements in Mine-Car-Dumping Apparatus, of which the following is a specification.

Our invention relates to improvements in car dumps where the car runs on a tilting platform, and is automatically dumped, the dumping platform returning by gravity to its horizontal position after the car is empty.

We aim to hold the car securely upon the platform during the dumping action without injury to the car or any of its parts, and particularly to avoid the necessity of engaging the wheels or axles of the car.

In the drawings, Figure 1 is a longitudinal vertical section on line A—B of Fig. 2 showing the car in the position it occupies the instant before dumping. Fig. 2 is a plan view of the dump without the car. Fig. 3 is a transverse section on line C—D of Fig. 1. Fig. 4 is a longitudinal vertical section with the car in dumping position. Fig. 5 is a longitudinal vertical section showing the dump in position after the car has left it.

Fig. 1 shows a frame work supporting an axle 13 which in turn supports a tilting platform 18 constructed preferably of structural steel and thoroughly braced and fastened together, having rails which coincide and form an extension of the rails 3 of the track. The platform 18 tilts on the axle 13 and holds a relation to this axle to permit the dumping of the car as the loaded car runs upon the platform, the axle 13 being to one side of the center of the platform 18. Pivoted on the axle 13 is a frame 9 preferably constructed of structural metal and having at its front end a metal bound block of wood or steel or iron 10, which when in the position shown in Fig. 1, is adapted to come in contact with the bumper of the loaded car and hold it securely during the tilting or dumping action. The car is suitably braced at 12 to receive the impact as it comes in contact with the bumper block 10. By engaging the end of the car rather than the car wheel or the axle a construction is provided which does not in any way weaken or injure the structure of the car, and this is one of the principal objects of our invention.

The upward movement of the frame 9 is limited by the retaining stops 11, which are secured to the sides of the frame 18 and extend upwardly or downwardly to engage the flanges of the frame 9. The normal position of the pivoted frame 9 is shown in full lines in Fig. 5, in which the depending bent end of the frame is, through the cross piece 23 engaged by the spring hook 6, and in this position the bumper block 10 is out of the way of any passing car. When the car, however, is to be run upon the platform 18 for the purpose of dumping the car, the car, in its passage to the platform depresses the lever 5, which by a rod 7, is connected with the lower end of the spring catch 6 with the result that the catch is drawn back, as shown in Fig. 1, and the lower end of the frame 9 drops to the position shown in that figure, and in dotted lines Fig. 5, by reason of the fact that this lower end of the frame 9 is weighted as at 8. In this position the block 10 is in line with the bumper of the car, and as the loaded car passes to the platform 18 the platform is tilted and in the downward movement of the car the tail board of the car is raised, as shown in Fig. 4, by the arm 16 coming in contact with the projection 15 on the tail board, this tail board, shown at 17, being pivoted to the body of the car. The arms 16 are pivotally connected to the under side of the rails 3, and are kept in normal position, as shown in Fig. 5, by a weight 22 depending from one end of a rock-shaft 20 supporting the arms 16. The position of the frame 18 may be controlled by a brake-arm 24 having the shape of an arc of a circle concentric with the axle 13, this arm passing through clamps 25 and 26, the clamp 26 being attached to the end of a stirrup U-bolt 27, the end of which passes through the sill 1, and is provided with a suitable hand or foot lever. A support 4 is provided to sustain the platform 18 when in its tilted position.

What we claim is:

1. A tilting device for cars, comprising a platform 18 and a pivoted frame 9 having movement independent of the platform 18 carrying a bumper block adapted to contact with the end of the car, substantially as described.

2. In combination with the tilting platform 18, a pivoted frame 9 having a bumper block for engaging and holding the car, means for holding the frame 9 out of normal position, and means for restoring the frame to normal position, substantially as described.

3. In combination with the tilting frame 18, a pivoted frame 9 having a bumper block, a catch for the end of the frame 9 and means for actuating the catch to release the clamp, substantially as described.

In testimony whereof we affix our signatures in presence of two witnesses.

EDMUND BOLLING HUBARD.
WILLIAM GATEWOOD ADAMS.

Witnesses:
M. R. REAMEY,
E. C. McCOMB.